(12) United States Patent
Nassib et al.

(10) Patent No.: US 8,901,953 B2
(45) Date of Patent: Dec. 2, 2014

(54) ENFORCING PERFORMANCE LONGEVITY ON SEMICONDUCTOR DEVICES

(71) Applicant: Intel Corporation, Santa Clara, CA (US)

(72) Inventors: Abdi Nassib, Portland, OR (US); Gyan Prakash, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 91 days.

(21) Appl. No.: 13/631,271

(22) Filed: Sep. 28, 2012

(65) Prior Publication Data

US 2014/0091831 A1 Apr. 3, 2014

(51) Int. Cl.
*H03K 19/00* (2006.01)

(52) U.S. Cl.
USPC .......................................................... 326/8

(58) Field of Classification Search
USPC .......................................................... 326/8
See application file for complete search history.

(56) References Cited

U.S. PATENT DOCUMENTS

2010/0045336 A1* 2/2010 Krueger et al. .................. 326/8
2013/0147511 A1* 6/2013 Koeberl et al. .................. 326/8

OTHER PUBLICATIONS

"Engineering Sample," Wikipedia, The Free Encyclopedia, Aug. 6, 2011, web page available at: <http://en.wikipedia.org/w/index.php?title=Engineering_sample&oldid=443419603>, 1 page.
Intel Corp., "Processors: Information about Intel Engineering/Qualification Sample Processors," May 8, 2012, web page available at: <http://www.intel.com/support/processors/sb/CS-030747.htm>, 2 pages.

* cited by examiner

*Primary Examiner* — Jason M Crawford
(74) *Attorney, Agent, or Firm* — Barnes & Thornburg, LLP

(57) ABSTRACT

Technologies for enforcing an expiration policy on an electronic engineering sample component includes a one-time programmable fuse to store a manufacture date of the electronic engineering sample component, another one-time programmable fuse to store an expiration date of the electronic engineering sample component, and a component life management engine to compare a current date of the electronic engineering sample component with the expiration date of the electronic engineering sample component. The component life management engine to disable or lock the electronic engineering sample component in response to determining that the current date of the electronic engineering sample component exceeds the expiration date of the electronic engineering sample component. In some embodiments, a computing device may enforce the expiration policy for the electronic engineering sample component. The computing device may also be communicatively coupled to a remote unlock server and may receive authorization to unlock a disabled engineering sample component.

30 Claims, 7 Drawing Sheets

ENFORCING PERFORMANCE LONGEVITY ON SEMICONDUCTOR DEVICES

BACKGROUND

Engineering samples are pre-production devices loaned by semiconductor device manufacturers to companies and other entities for evaluation, interoperability testing, and product readiness purposes prior to product launch. Often, those samples are of a similar quality and level of operation to production devices. In some cases, engineering samples may include additional or proprietary features that are not included in production devices. As such, engineering samples are not typically intended for general public use.

To prevent the public distribution of engineering samples, semiconductor device manufactures typically only loan samples to companies and other entities subject to specific contractual terms and conditions. For example, semiconductor device manufactures generally only loan engineering samples to those Original Equipment Manufacturers (OEMs), Original Device Manufacturers (ODMs), and Independent Software Vendors (ISVs) that have agreed in advance to certain legal disclaimers (e.g., regulatory compliance disclosures, lack of warranty coverage, device ownership statements, etc.) and conditions (e.g., agreements not to sell, resell, distribute, disclose confidential information, intended use, etc.). Notwithstanding those agreements, a number of engineering samples still somehow find their way into the general public where they are distributed, sold in the open market, or are used in a manner contrary to the intended purpose.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
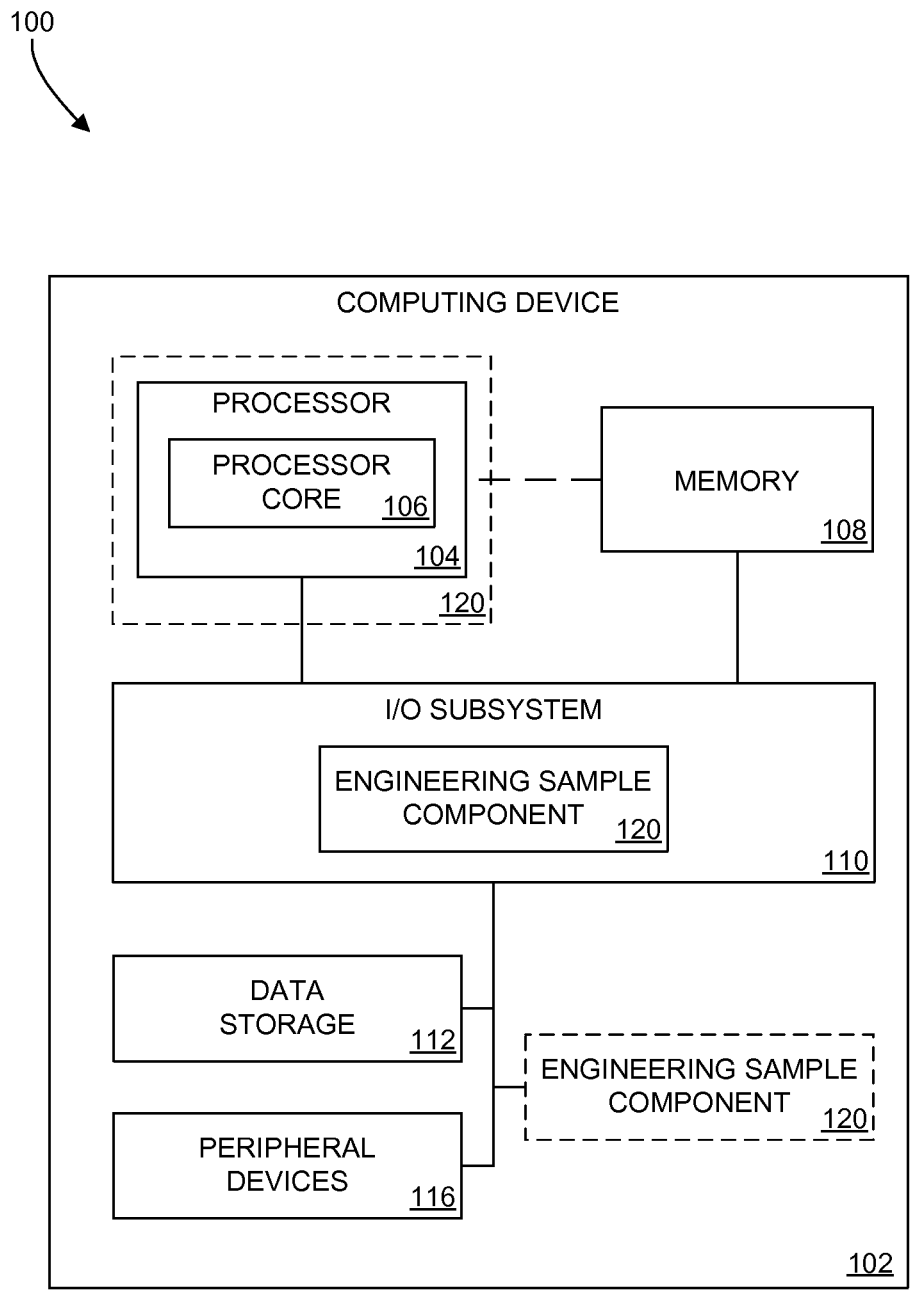
FIG. 1 is a simplified block diagram of at least one embodiment of a system for enforcing an expiration policy on an engineering sample component.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated by one skilled in the art, however, that embodiments of the disclosure may be practiced without such specific details. In other instances, control structures, gate level circuits and full software instruction sequences have not been shown in detail in order not to obscure the description of the of the concepts described herein. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the concepts described herein may be implemented in hardware, firmware, software, or any combination thereof. Embodiments implemented in a computer system may include one or more point-to-point or bus-based interconnects between components. Embodiments of the concepts described herein may also be implemented as instructions carried by or stored on one or more machine-readable or computer-readable storage media, which may be read and executed by one or more processors. A machine-readable or computer-readable storage medium may be embodied as any device, mechanism, or physical structure for storing or transmitting information in a form readable by a machine (e.g., a computing device). For example, a machine-readable or computer-readable storage medium may be embodied as read only memory (ROM) device(s); random access memory (RAM) device(s); magnetic disk storage media; optical storage media; flash memory devices; mini- or micro-SD cards, memory sticks, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative system 100 for enforcing a policy on an engineering sample includes a computing device 102 and an electronic engineering sample component 120 communicatively coupled thereto. The electronic engineering sample component 120 may be embodied as a semiconductor device loaned to an OEM, an ODM, or an ISV by a semiconductor device manufacturer for evaluation, interoperability testing, and product readiness purposes prior to launching the device to the general public. For example, the electronic engineering sample component 120 may be embodied as a processor, motherboard, computing device, peripheral device, electronic device, integrated circuit, or any other type of electronic device or component manufactured for purposes of testing and evaluation prior to launch (e.g., "pre-production silicon"). It should be understood that although the electronic engineering sample component 120 is described as being embodied as a semiconductor device manufactured for pre-production testing and evaluation, the electronic engineering component may instead be embodied as a semiconductor device intended for sale or use by the general public. For example, in such embodiments, the electronic engineering sample component 120 may be embodied as a processor, motherboard, computing device, peripheral device, electronic device, integrated circuit, or any other type of electronic device or component manufactured for general consumer use (e.g., "production silicon").

In some embodiments, the electronic engineering sample component 120 may comprise a component of an I/O subsystem 110 of the computing device 102, a component or a device communicatively coupled to the I/O subsystem 110 of the computing device 102, or all or a portion of a processor 104 (e.g., a processor core 106) of the computing device 102. As discussed in more detail below, the electronic engineering sample component 120 may enforce one or more policies as a function of information securely stored in the electronic engineering sample component 120 itself. Such information may be securely stored in one or more one-time programmable (OTP) fuses embedded in the electronic engineering sample component 120. For example, an OTP fuse may be programmed to comprise the date and time (e.g., a timestamp) corresponding to the date and time that the electronic engineering sample component 120 was manufactured. As discussed in more detail below, another OTP fuse may be programmed to comprise a date and time of expiration for the electronic engineering sample component 120. Additionally or alternatively, the electronic engineering sample component 120 may include one or more other OTP fuses, which may be configured to include another date and time of expiration or one or more other policies to be enforced on the electronic engineering sample component 120.

In some embodiments, the OTP fuses may be configured by the semiconductor device manufacturer during manufacturing of the electronic engineering sample component 120. That is, one or more of the OTP fuses may be set by the semiconductor manufacturer prior to loaning or otherwise releasing the electronic engineering sample component 120 to an OEM, an ODM, an ISV, or directly into the open market. Additionally or alternatively, one or more other OTP fuses may be configured after manufacturing of the electronic engineering sample component 120. For example, the one or more other OTP fuses may be set by the OEM, ODM, or ISV to which the semiconductor device manufacturer has loaned or otherwise provided the electronic engineering sample component 120 to after manufacturing.

The electronic engineering sample component 120 may comprise logic (e.g., firmware, software, instructions, hardware, software, or any combination thereof) to enforce one or more policies that either permit or restrict usage of the electronic engineering sample component 120 in response to one or more reference events occurring or conditions being met. For example, in some embodiments, the electronic engineering sample component 120 may comprise a policy that dictates the maximum amount of time the electronic engineering sample component 120 may be used. The policy may further set forth an action to take in response to the electronic engineering sample component 120 being used for the maximum amount of time. To do so, the electronic engineering sample component 120 may determine whether a timer has expired. In response to making such a determination, all functionality of the electronic engineering sample component 120, or a portion thereof, may be disabled or otherwise locked. In that way, a timed operational limit may be placed on the electronic engineering sample component 120, which effectively ages the electronic engineering sample component 120. As a result, the electronic engineering sample component 120 becomes less valuable and/or less desirable on the open market after the timed operational limit has been reached.

Additionally or alternatively, the computing device 102 may enforce one or more policies on the electronic engineering sample component 120 as a function of information securely stored in a different component of the computing device 102. Such information may comprise reprogrammable data stored in secure memory storage (e.g., the secure memory storage 514 of FIG. 5) of the computing device 102. In some embodiments, the data stored in such secure memory storage of the computing device 102 may comprise one or more of the date and time (e.g., a timestamp) corresponding to the date and time that the electronic engineering sample component 120 was manufactured, the date/time the electronic engineering sample component 120 will expire, and one or more other policies to be enforced on the electronic engineering sample component 120 by the computing device 102.

Figure 5:
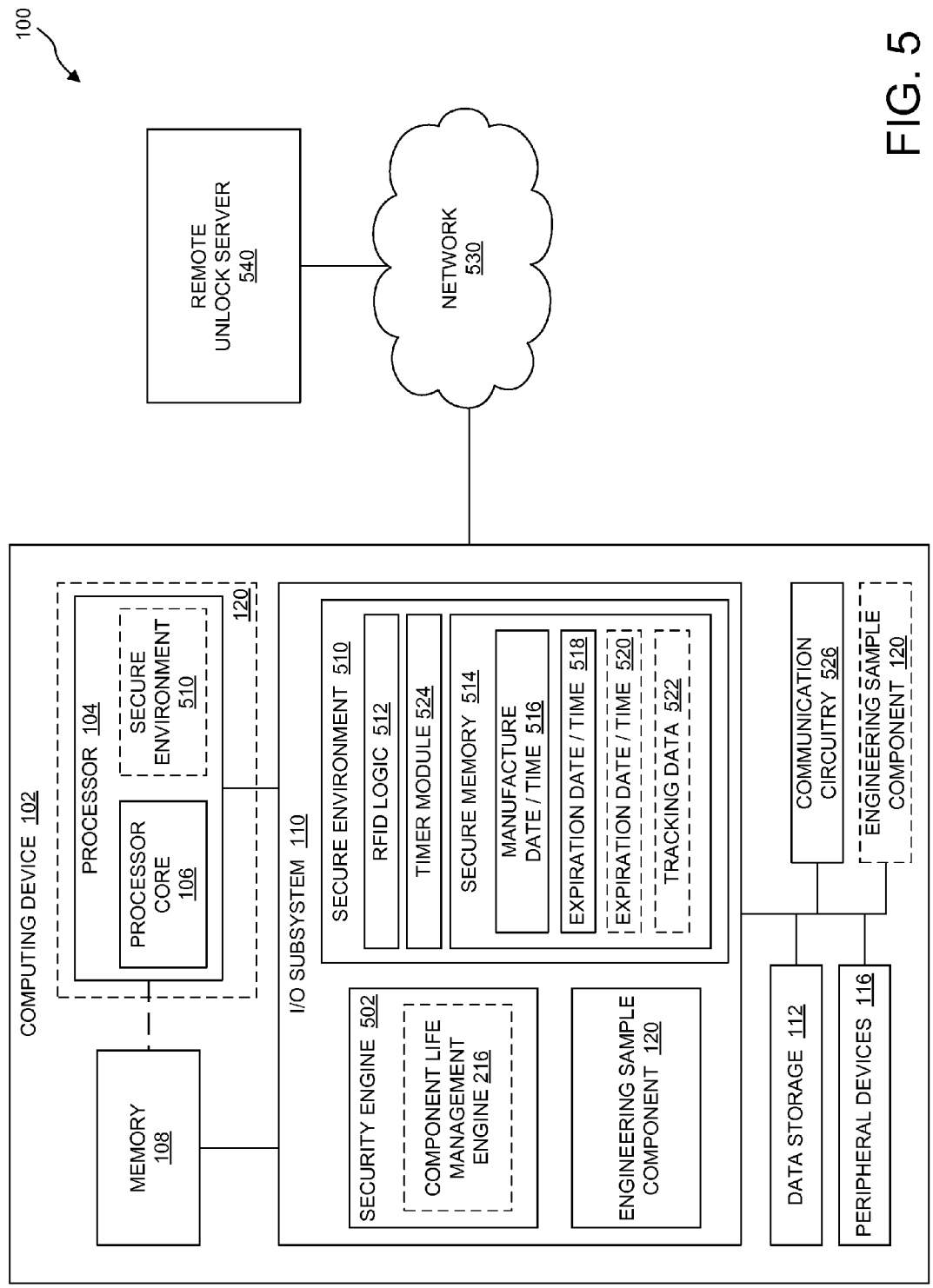
FIG. 5 is a simplified block diagram of at least one embodiment of a system for enforcing an expiration policy on the electronic engineering sample component of FIG. 1 using a computing device in communication with a remote unlock server.

In embodiments wherein the computing device 102 enforces one or more policies for the electronic engineering sample component 120, the system 100 may comprise the computing device 102, the electronic engineering sample component 120 and a remote unlock server 540 as shown in the illustrative embodiment of FIG. 5. In such embodiments, the computing device 102 may unlock and/or extend an expiration date/time of the electronic engineering sample component 120 as a function of communications with the remote unlock server 540 over a network 530. To do so, the computing device 102 may reconfigure and/or reprogram the data stored in secure memory storage of the computing device 102 in response to receiving a message from the remote unlock server 540 authorizing the computing device 102 to unlock or extend the expiration date/time corresponding to the electronic engineering sample component 120.

The computing device 102 may be embodied as any type of computing device for processing data. In the illustrative embodiment of FIG. 1, the computing device 102 includes a processor 104, an I/O subsystem 110, a memory 108, a data storage 112, one or more peripheral devices 116, and an electronic engineering sample component 120. In some embodiments, several of the foregoing components may be incorporated on a motherboard of the computing device 102, while other components may be communicatively coupled to the motherboard via, for example, a peripheral port. Furthermore, it should be appreciated that the computing device 102 may include other components, sub-components, and devices commonly found in a computing device, which are not illustrated in FIG. 1 for clarity of the description.

The processor 104 of the computing device 102 may be embodied as any type of processor capable of executing software/firmware, such as a microprocessor, digital signal processor, microcontroller, or the like. The processor 104 is illustratively embodied as a single core processor having a processor core 106. However, in other embodiments, the processor 104 may be embodied as a multi-core processor having multiple processor cores 106. Additionally, the computing device 102 may include additional processors 104 having one or more processor cores 106.

The I/O subsystem 110 of the computing device 102 may be embodied as circuitry and/or components to facilitate input/output operations with the processor 104 and/or other components of the computing device 102. In some embodiments, the I/O subsystem 110 may be embodied as a memory controller hub (MCH or "northbridge"), an input/output controller hub (ICH or "southbridge"), and a firmware device. In such embodiments, the firmware device of the I/O subsystem 110 may be embodied as a memory device for storing Basic Input/Output System (BIOS) data and/or instructions and/or other information (e.g., a BIOS driver used during booting of the computing device 102). However, in other embodiments, I/O subsystems having other configurations may be used. For example, in some embodiments, the I/O subsystem 110 may be embodied as a platform controller hub (PCH). In such embodiments, the memory controller hub (MCH) may be incorporated in or otherwise associated with the processor 104, and the processor 104 may communicate directly with the memory 108 (as shown by the hashed line in FIG. 1). Additionally, in other embodiments, the I/O subsystem 110 may form a portion of a system-on-a-chip (SoC) and be incorporated, along with the processor 104 and other components of the computing device 102, on a single integrated circuit chip.

The processor 104 is communicatively coupled to the I/O subsystem 110 via a number of signal paths. These signal paths (and other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, point-to-point interconnects, and/or the like.

The memory 108 of the computing device 102 may be embodied as, or otherwise include, one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 108 is communicatively coupled to the I/O subsystem 110 via a number of signal paths. Although only a single memory device 108 is illustrated in FIG. 1, the computing device 102 may include additional memory devices in other embodiments. Various data and software may be stored in the memory device 108. For example, one or more operating systems (OS), applications, programs, libraries, and drivers that make up the software stack executed by the processor 104 may reside in memory 108 during execution.

The data storage 112 may be embodied as any type of device or devices configured for the short-term or long-term storage of data such as, for example, memory devices and circuits, memory cards, hard disk drives, solid-state drives, or other data storage devices. In embodiments wherein the computing device 102 enforces one or more policies on the electronic engineering sample component 120, the data storage 112 may also be used to store data associated with the electronic engineering sample component 120.

The peripheral devices 116 of the computing device 102 may include any number of additional input/output devices, interface devices, and/or other peripheral devices. For example, the peripheral devices 116 may include a display for displaying content to a user, a keyboard, mouse, or other input/output peripheral devices. The peripheral devices 116 are communicatively coupled to the I/O subsystem 110 via a number of signal paths thereby allowing the I/O subsystem 110 and/or processor 104 to receive inputs from and send outputs to the peripheral devices 116.

The electronic engineering sample component 120 may be embodied as any type of semiconductor device or devices loaned to an OEM, an ODM, or an ISV by a semiconductor device manufacturer for evaluation, interoperability testing, and product readiness purposes prior to launching the device (s) to the general public. For example, the electronic engineering sample component 120 may be embodied as a processor, motherboard, computing device, peripheral device, electronic device, integrated circuit, or any other type of electronic device or component manufactured for purposes of testing and evaluation prior to launch (e.g., "pre-production silicon"). It should be understood that although the electronic engineering sample component 120 is described as being embodied as a semiconductor device manufactured for pre-production testing and evaluation, the electronic engineering sample component may instead be embodied as a semiconductor device intended for sale or use by the general public. For example, in such embodiments, the electronic engineering sample component 120 may be embodied as a processor, motherboard, computing device, peripheral device, electronic device, integrated circuit, or any other type of electronic device or component manufactured for general consumer use (e.g., "production silicon"). In some embodiments, the electronic engineering sample component 120 may comprise a component of an I/O subsystem 110 of the computing device 102, a component or a device communicatively coupled to the I/O subsystem 110 of the computing device 102, or all or a portion of a processor 104 of the computing device 102. As discussed in more detail below, the electronic engineering sample component 120 or the computing device 102 may enforce one or more policies as a function of information securely stored in the electronic engineering sample component 120 or in the secure memory 514 of the computing device 102.

Figure 2:
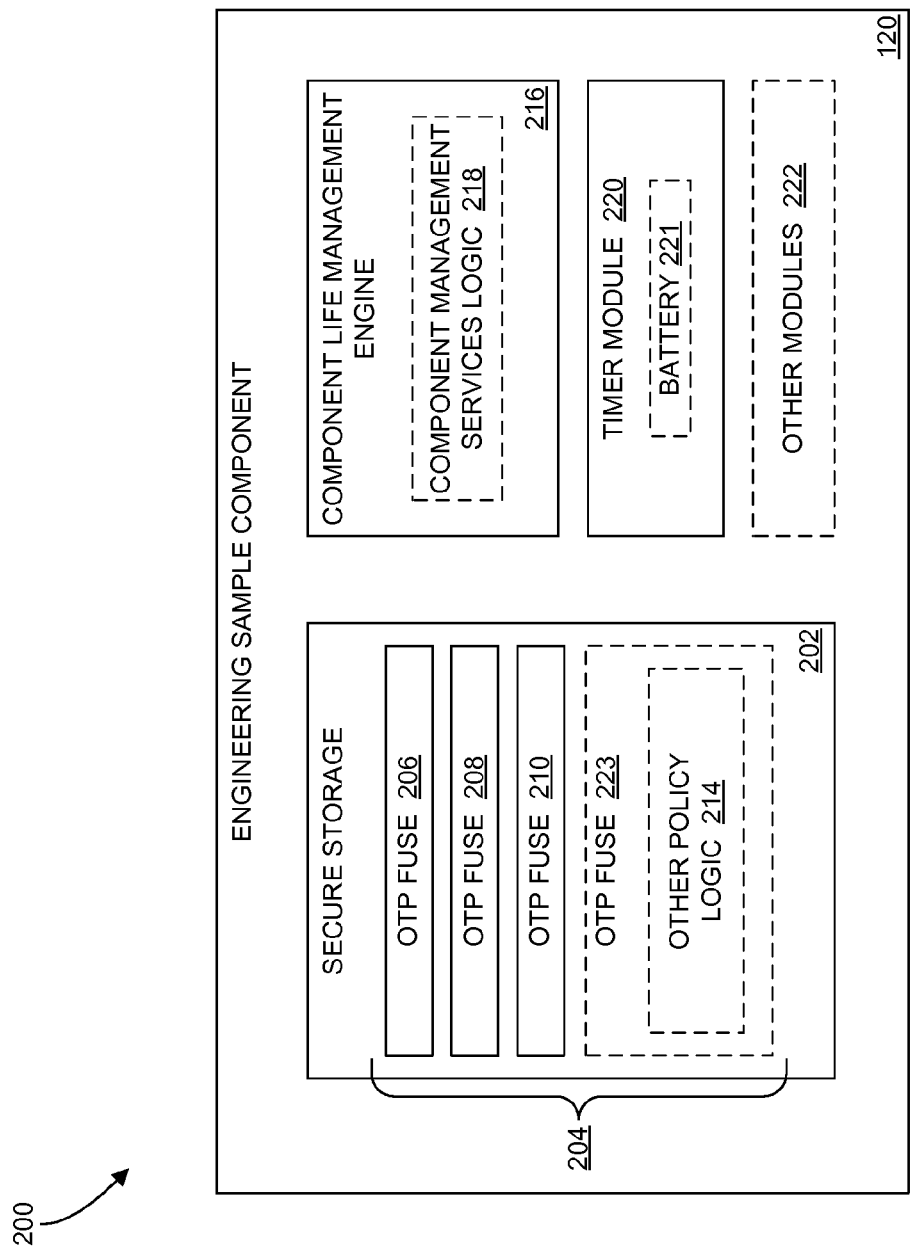
FIG. 2 is a simplified block diagram of at least one embodiment of an environment of the electronic engineering sample component of FIG. 1 on which an expiration policy may be enforced.

Referring now to FIG. 2, one embodiment of an environment 200 of the electronic engineering sample component 120 includes a secure storage 202, one or more one-time programmable (OTP) fuses 204, a component life management engine 216, and a timer module 220. The electronic engineering sample component 120 may include other modules 222, which provide additional functionality to the electronic engineering sample component 120 or to the computing device 102. As discussed in more detail below, the electronic engineering sample component 120 may also include, in some embodiments, component expiration policy logic 214 and/or component management services logic 218. It should be understood that the environment 200, and/or any of the modules included therein, may be implemented in hardware, firmware, software, or any combination thereof.

As discussed, the electronic engineering sample component 120 may enforce one or more policies as a function of information securely stored in the electronic engineering sample component 120. To do so, the component life management engine 216 may include logic (e.g., firmware, software, instructions, hardware, software, or any combination thereof) to enforce one or more policies that either permit or restrict usage of the electronic engineering sample component 120 in response to one or more reference events occurring or conditions being met. To ensure that enforcement of the policies is not circumvented, the component life management engine 216 may be executed upon booting or restarting the electronic engineering sample component 120 or the computing device 102 communicatively coupled thereto. Additionally or alternatively, the component life management engine 216 may also be executed upon inserting the electronic engineering sample component 120 into a computing device 102 that is already running. In that way, the one or more policies may also be enforced in response to hot-plugging and/or hot-swapping the electronic engineering sample component 120.

In some embodiments, the component life management engine 216 includes the one or more policies that either permit or restrict usage of the electronic engineering sample component 120. To do so, the policies may be embodied as one or more rules that trigger the component life management engine 216 to perform an action in response to one or more reference events occurring or conditions being met. For example, a policy of the component life management engine 216 may be embodied as a rule specifying a duration of time (e.g., the maximum amount of time) the electronic engineering sample component 120 may be used. To determine whether the electronic engineering sample component 120 has been used for the specified duration of time, the component life management engine 216 may retrieve a reference date and time from the timer module 220. As discussed in more detail below, the reference date and time retrieved from the timer module 220 may be determined as a function of the date and time that the electronic engineering sample component 120 was manufactured. The component life management engine 216 may also retrieve an expiration date and time corresponding to the electronic engineering sample component 120. Thereafter, the component life management engine 216 may compare the expiration date and time with the reference date and time. In response to determining that the expiration date and time equals or exceeds the reference time, the component life management engine 216 may restrict all or a portion of the functionality of the electronic engineering sample component 120. For example, in response to determining that the electronic engineering sample component 120 has been used for the maximum amount of time specified, the component life management engine 216 may disable, reduce the functionality (e.g., reduced processing power, degraded quality output, limit features, etc.), or "brick" or otherwise render the electronic engineering sample component 120 unusable or less desirable. It should be understood that although the component life management engine 216 is described as comprising an expiration policy in the illustrative embodiment, the component life management engine 216 may comprise any other type of policy to be enforced on the electronic engineering sample component 120. For example, the component life management engine 216 may comprise a policy setting forth a location that the electronic engineering sample component 120 may be used, for what purpose the electronic engineering sample component 120 may be used, which components of the computing device 102 are required for use with the electronic engineering sample component 120, or any limitation or condition placed on the usage of the electronic engineering sample component 120.

The component life management engine 216 may enforce the one or more policies as a function of information securely stored in the electronic engineering sample component 120 itself. To do so, the component life management engine 216 may retrieve or otherwise access information stored in the secure storage 202 of the electronic engineering sample component 120. Such information may be securely stored in one or more one-time programmable (OTP) fuses 204 embedded in the secure storage 202 the electronic engineering sample component 120. For example, an OTP fuse 206 may be programmed to comprise the date and time (e.g., a timestamp) corresponding to the date and time that the electronic engineering sample component 120 was manufactured. Another OTP fuse 208 may be programmed to comprise a date and time of expiration for the electronic engineering sample component 120. Additionally or alternatively, the electronic engineering sample component 120 may comprise one or more other OTP fuses 204, which may be configured to include another expiration date and time (e.g., OTP fuse 210) or one or more other policies 214 to be enforced on the electronic engineering sample component 120 (e.g., OTP fuse 223) for example, by the component life management engine 216.

In some embodiments, the OTP fuses 204 may be configured by the semiconductor device manufacturer during manufacturing of the electronic engineering sample component 120. That is, one or more of the OTP fuses 204 may be set by the semiconductor manufacturer prior to loaning or otherwise providing the electronic engineering sample component 120 to an OEM, an ODM, an ISV, or directly into the open market. Additionally or alternatively, one or more other OTP fuses 204 may be configured after manufacturing of the electronic engineering sample component 120. For example, the one or more other OTP 204 fuses may be set by the OEM, ODM, or ISV to which the semiconductor device manufacturer has loaned or otherwise provided the electronic engineering sample component 120 to after manufacturing. Additionally, in some embodiments, one or more of the OTP fuses 204 may override another one of the OTP fuses 204. For example, the OTP fuse 208 may override the OTP fuse 206.

In embodiments wherein the component life management engine 216 enforces a policy defining a duration in time in which the electronic engineering sample component 120 may be used, the component life management engine 216 may retrieve a reference date and time from the timer module 220. The timer module 220 may keep track of an amount of time that has passed since the electronic engineering sample component 120 was manufactured. To do so, the timer module 220 may utilize any number of timers, clock signals, counters, algorithms, or any other component of the electronic engineering sample component 120 suitable for determining the passage of time. In some embodiments, the timer module 220 may determine an amount of time that has passed (e.g., counting up) since the occurrence of a particular event such as, for example, since the electronic engineering sample component 120 was manufactured. In other embodiments, the timer module 220 may determine an amount of time remaining (e.g., counting down) until the occurrence of an event such as, for example, until the expiration of an expiration date and time.

The component life management engine 216 may initialize the timer module 220 upon first boot of the electronic engineering sample component 120. To do so, the component life management engine 216 may retrieve the date and time that the electronic engineering sample component 120 was manufactured from one of the OTP fuses 204 such as, for example, the OTP fuse 206. The component life management engine 216 may then configure the timer module 220 to comprise a reference date and time, which may be determined as a function of the date and time in which the electronic engineering sample component 120 was manufactured. Thereafter, the component life management engine 216 may compare the reference date/time to one or more expiration dates/times.

In some embodiments, the timer module 220 may comprise a battery 221. The battery 221 may facilitate maintaining storage of data for the timer module 220. It should be understood that although the timer module 220 is shown as comprising the battery 221 in the illustrative embodiment, the battery 221 may be comprise a separate component of the electronic engineering sample component 120 in some embodiments.

To prevent circumvention of enforcement policies based on the passage of time, the component life management engine 216 may comprise the component management services logic 218. The component management services logic 218 comprises a policy that locks or otherwise disables the electronic engineering sample component 120 in response to the component life management engine 216 detecting that the battery 221 has been removed. In that way, attempts to reset the timer module 220 by removing the battery 221 is prevented.

Figure 3:
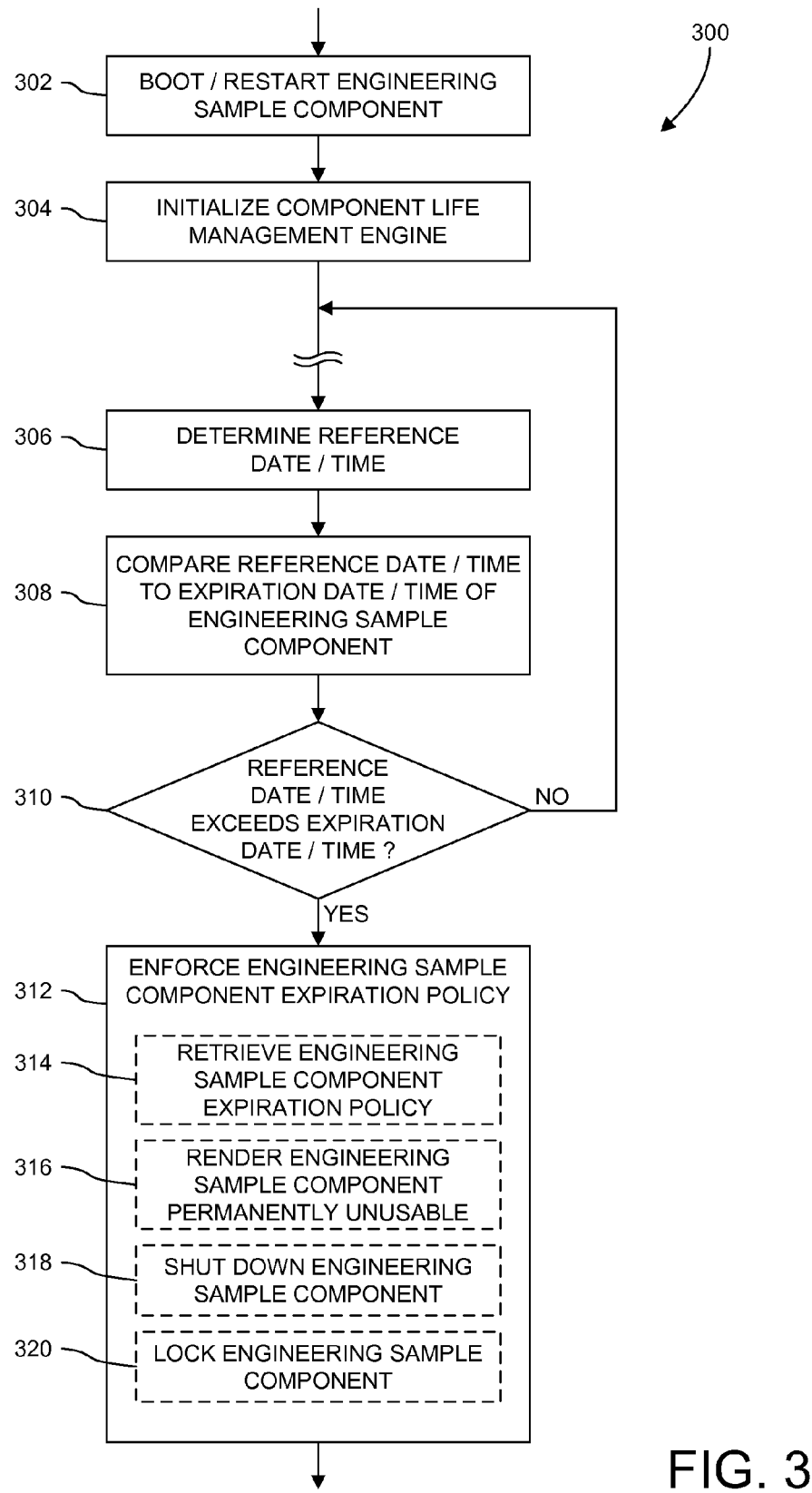
FIG. 3 is a simplified block diagram of at least one embodiment of a method for enforcing an expiration policy on the electronic engineering sample component of FIGS. 1 and 2.

Referring now to FIG. 3, at least one embodiment of a method 300 for enforcing an expiration policy on the electronic engineering sample component 120 begins with block 302. In block 302, the electronic engineering sample component 120 is booted and/or restarted. As discussed above, the electronic engineering sample component 120 may also be hot-swapped and/or hot-plugged into the computing device 102 in some embodiments. Upon booting, restarting, or otherwise initializing the electronic engineering sample component 120, the method 300 advances to block 304.

In block 304, the component life management engine 216 is initialized. The component life management engine 216 may comprise logic (e.g., firmware, software, instructions, hardware, software, or any combination thereof) to enforce one or more policies that either permit or restrict usage of the electronic engineering sample component 120 in response to one or more reference events occurring or conditions being met. In some embodiments, the component life management engine 216 may enforce a policy setting forth a maximum time that the electronic engineering sample component 120 may be used. To do so, the component life management engine 216 may retrieve a manufacture date and time of the electronic engineering sample component 120 from a one-time programmable (OTP) fuse such as, for example, the OTP fuse 206. In such embodiments, the component life management engine 216 may configure the timer module 220 to comprise the manufacture date and time as an initial reference date and time. The component life management engine 216 may do so during a first boot or initialization of the electronic engineering sample component 120. The timer module 220 may then continuously increment the reference date and time. After initializing the component life management engine 216, the method 300 advances to block 306.

In block 306, the component life management engine 216 determines a reference date/time. To do so, the component life management engine 216 may retrieve the reference date/time from the timer module 220. The method 300 then advances to block 308.

In block 308, the reference date/time is compared to an expiration date/time corresponding to the electronic engineering sample component 120. As discussed above, the semiconductor device manufacturer and one or more of an OEM, an ODM, an ISV may securely store an expiration date/time corresponding to the maximum date/time for which the electronic engineering sample component 120 may be used. The expiration date/time may be securely stored in one or more of the other OTP fuses 204, such as, for example the OTP fuse 208, OTP fuse 210, and/or the OTP fuse 223. The component life management engine 216 may retrieve the expiration date/time corresponding to the electronic engineering sample component 120. Thereafter, the component life management engine 216 may compare the retrieved expiration date/time to the reference date/time. The method 300 then advances to block 310.

In block 310, the component life management engine 216 determines whether the reference date/time exceeds the expiration date for the electronic engineering sample component 120. If, at block 310, the component life management engine 216 determines the reference date/time does not exceed the expiration date/time, the method 300 loops back to block 306 to make another determination. If, however, the component life management engine 216 determines the reference date/time exceeds the expiration date/time, the method 300 advances to block 312.

In block 312, the component life management engine 216 enforces the policy setting forth the maximum time the electronic engineering sample component 120 may be used. To do so, the component life management engine 216 may perform one or more actions to take in response to the electronic engineering sample component 120 being used for the maximum amount of time. For example, in block 316, the component life management engine 216 may render the electronic engineering sample component 120 permanently unusable. Additionally or alternatively, the component life management engine 216 may shut down the electronic engineering sample component 120 in block 318. In block 320, the component life management engine 216 may instead lock the electronic engineering sample component 120. As discussed above, the component life management engine 216 may enforce, in block 314, one or more other policies 214 on the electronic engineering sample component 120 in some embodiments. In such embodiments, the component life management engine 216 may retrieve the one or more other policies 214 and perform the corresponding action.

Figure 4:
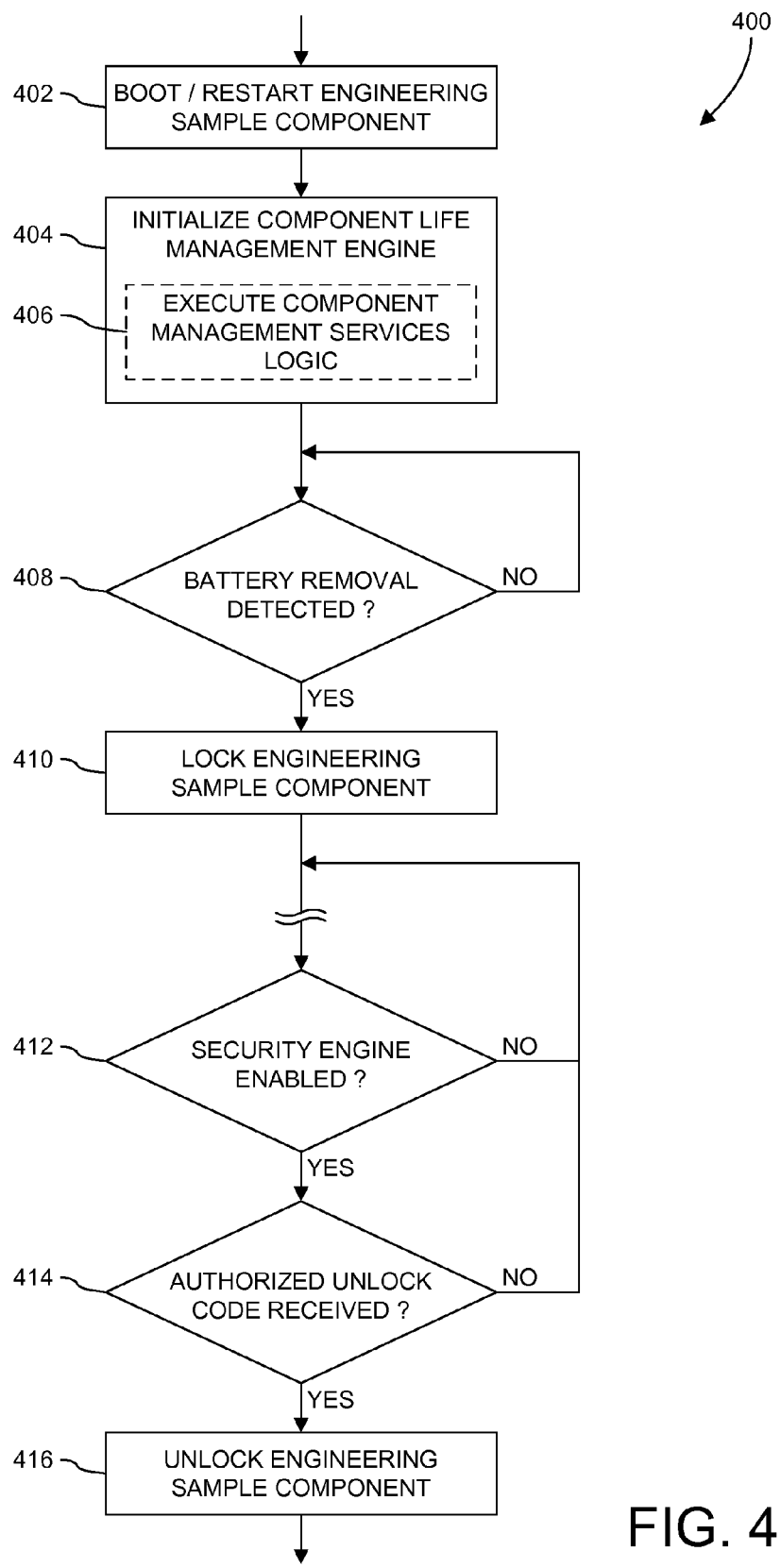
FIG. 4 is a simplified block diagram of at least one embodiment of a method for preventing the circumvention of an expiration policy enforced on the electronic engineering sample component of FIGS. 1 and 2.

Referring now to FIG. 4, at least one embodiment of a method 400 for preventing the circumvention of an expiration policy enforced on the electronic engineering sample component 120 begins with block 402. In block 402, the electronic engineering sample component 120 is booted and/or restarted. As discussed above, the electronic engineering sample component 120 may also be hot-swapped and/or hot-plugged into the computing device 102 in some embodiments. Upon booting, restarting, or otherwise initializing the electronic engineering sample component 120, the method 400 advances to block 404.

In block 404, the component life management engine 216 is initialized. As discussed above, the component life management engine 216 may comprise logic (e.g., firmware, software, instructions, hardware, software, or any combination thereof) to enforce one or more policies that either permit or restrict usage of the electronic engineering sample component 120 in response to one or more reference events occurring or conditions being met. The method 400 then advances to block 406 in which the component life management engine 216 executes component management services logic 218 to prevent the circumvention of the one or more policies. In some embodiments, the component management services logic 218 may detect the removal of a battery of the electronic engineering sample component 120. It should be understood that the component management services logic 218 may perform other actions for preventing circumvention of the one or more policies in some embodiments. The method 400 then advances to block 408.

In block 408, the component life management engine 216 detects whether the battery 221 has been removed using the component management services logic 218. If, at block 408, the component life management engine 216 determines the battery 221 has been not been removed, the method 400 loops back to block 408 to continue detecting whether the battery 221 is removed. If, however, the component life management engine 216 determines that the battery 221 has been removed, the method 400 advances to block 410 in which the component life management engine 216 locks or otherwise disables the electronic engineering sample component 120. The method 400 then advances to block 412.

In block 412, the component life management engine 216 determines, in some embodiments, whether a security engine (e.g., a trusted execution environment) is enabled on the computing device 102 in which the electronic engineering sample component 120 is operating. In some embodiments, the security engine may be utilized to securely unlock or otherwise re-enable the electronic engineering sample component 120, which was locked by the component life management engine 216. If, at block 412, the component life management engine 216 determines that a security engine is enabled on the computing device 102, the method 400 advances to block 414. If, however, the component life management engine 216 instead determines that a security engine is not enabled on the computing device 102, the electronic engineering sample component 120 remains locked and the method 400 returns to block 412 to continue determining whether a security engine is enabled.

In block 414, the component life management engine 216 may determine whether an authorized unlock code has been received. For example, the component life management engine 216 may receive an unlock code from a BIOS authentication screen using the security engine as a secure proxy. The component life management engine 216 may verify the unlock code to determine whether the unlock code is authorized. If, at block 414, the component life management engine 216 determines that an unlock code is either not received or not authorized, the method 400 returns to block 412 to detect whether the security engine is still enabled on the computing device 102. On the other hand, if the component life management engine 216 determines that an unlock code is received and is authorized, the method 400 instead advances to block 416 in which the component life management engine 216 unlocks and/or re-enables the electronic engineering sample component 120 with the unlock code.

As discussed above, in some embodiments the computing device 102 rather than the electronic engineering sample component 120 may enforce the one or more policies for the electronic engineering sample component 120. To do so, the computing device 102 may enforce the one or more policies on the electronic engineering sample component 120 as a function of information securely stored in a different component of the computing device 102. In such embodiments, the computing device 102 may comprise the I/O subsystem 110, memory 108, data storage 112, one or more peripheral devices 116, and the electronic engineering sample component 120 illustrated in FIG. 1. In addition, to facilitate accessing the information securely stored in components other than the electronic engineering sample component 120, the computing device 102 may also include a security engine 502, a secure environment 510, communication circuitry 526, the network 530, and the remote unlock server 540 as illustrated in FIG. 5.

The I/O subsystem 110 may comprise the security engine 502 in some embodiments. The security engine 502 may be embodied as a microprocessor, such as a security co-processor, that operates independently of the processor 104. In such embodiments, the security engine 502 comprises the component life management engine 216, which as described above, comprises logic (e.g., firmware, software, instructions, hardware, software, or any combination thereof) to enforce one or more policies that either permit or restrict usage of the electronic engineering sample component 120 in response to one or more reference events occurring or conditions being met.

In some embodiments, the I/O subsystem 110 may also comprise the secure environment 510, which may be provided by the security engine 502. The secure environment 510 may be a secure and isolated environment that is accessible to the security engine 502, but inaccessible to the processor 104 and other components of the computing device 102. The secure environment 510 may comprise a component of the I/O subsystem 110 of the computing device 102 or a component of the processor 104 of the computing device 102. In some embodiments, the secure environment 510 includes radio-frequency identification (RFID) logic 512. The RFID logic 512 comprises logic (e.g., firmware, software, instructions, hardware, software, or any combination thereof) to facilitate secure communications with devices external to the computing device 102. For example, in some embodiments, the RFID logic may be used to securely update tracking information corresponding to the electronic engineering sample component 120 after being loaned out by a semiconductor device manufacturer.

In some embodiments, the secure environment 510 also includes a timer module 524. The timer module 524 may keep track of a current and/or a reference date/time of the computing device 102. To do so, the timer module 524 may utilize any number of timers, clock signals, counters, algorithms, or any other component of the computing device 102 suitable for determining the current date/time of the electronic engineering sample component 120. In some embodiments, the timer module 524 may determine an amount of time that has passed (e.g., counting up) since the occurrence of a particular event such as, for example, since the electronic engineering sample component 120 was manufactured. In other embodiments, the timer module 524 may determine an amount of time remaining (e.g., counting down) until the occurrence of an event such as, for example, until the expiration of an expiration date and time.

The secure environment 510 may also comprise a secure memory 514 in some embodiments. In such embodiments, the computing device 102 may enforce the one or more policies on the electronic engineering sample component 120 as a function of reprogrammable information securely stored in the secure memory 514. For example, the secure memory 514 may comprise a manufacture date and time 516, which may be indicative of the date and time the electronic engineering sample component 120 was manufactured. The secure memory 514 may also comprise an expiration date and time 518, which may be indicative of a date and time in which the electronic engineering sample component 120 can no longer be used. In some embodiments, the secure memory 514 may comprise another expiration date and time 520, which may be indicative of a different date and time in which the electronic engineering sample component 120 can no longer be used.

In some embodiments, the manufacture date and time 516 and the expiration date/time 518 may be stored in the secure memory 514 by the semiconductor manufacturer prior to loaning or otherwise providing the electronic engineering sample component 120 to an OEM, an ODM, an ISV, or directly into the open market. However, the another expiration date and time 520 may be configured after manufacturing of the electronic engineering sample component 120. For example, the another expiration date/time 520 may be stored in the secure memory 514 by the OEM, ODM, or ISV to which the semiconductor device manufacturer has loaned or otherwise provided the electronic engineering sample component 120 to after manufacturing. As discussed in more detail below, the component life management engine 216 may retrieve the expiration date/time 518 from the secure memory 514. The component life management engine 216 may then compare the expiration date/time 518 to a reference date and time, which may correspond to the manufacture date and time 516 of the electronic engineering sample component 120. If the reference date and time exceeds the expiration date/time 518, the component life management engine 216 may lock or otherwise disable the electronic engineering sample component 120.

In some embodiments, the secure memory 514 may also include tracking data 522. The tracking data 522 may comprise information corresponding to the distribution of the electronic engineering sample component 120. Similar to the another expiration date and time, 520 the tracking data 522 may be set by the OEM, ODM, or ISV to which the semiconductor device manufacturer has loaned or otherwise provided the electronic engineering sample component 120 to after manufacturing. To do so, the OEM, ODM, or ISV may use the RFID logic to securely update (e.g., via a password protected communication) the secure memory 514 to include the tracking data 522.

The communication circuitry 526 of the computing device 102 may be embodied as any number of devices and circuitry for enabling communications between the computing device 102 one or more remote computing devices over a network 530. For example, the communication circuitry 526 may enable communications between the computing device 102 and the remote unlock server 540 over the network 530. The communication circuitry 526 may be embodied as a network interface controller (NIC) in some embodiments. The network 530 may be embodied as any number of various wired and/or wireless communication networks. For example, the network 530 may be embodied as or otherwise include a local area network (LAN), a wide area network (WAN), a mobile network, or a publicly-accessible, global network such as the Internet. Additionally, the network 530 may include any number of additional devices to facilitate communication between the computing device 102 and the remote computing devices. The computing device 102 and the remote computing devices may use any suitable communication protocol to communicate with each other over the network 530 depending on, for example, the particular type of network(s) 530.

The remote unlock server 540 may be embodied as any type of server capable of performing the functions described herein. As such, the remote unlock server 540 may include various hardware and software components (e.g., a processor, memory, and communication circuitry) typically found in a server for communicating, storing, maintaining, and transferring data over a network. The remote unlock server 540 may receive a request through the network 530 to unlock and/or extend an expiration time of the electronic engineering sample component 120. After authenticating the request or the identity of the requestor, the remote unlock server 540 may transmit a response authorizing the unlocking of the electronic engineering sample component 120 or extending the corresponding expiration date/time.

Figure 6:
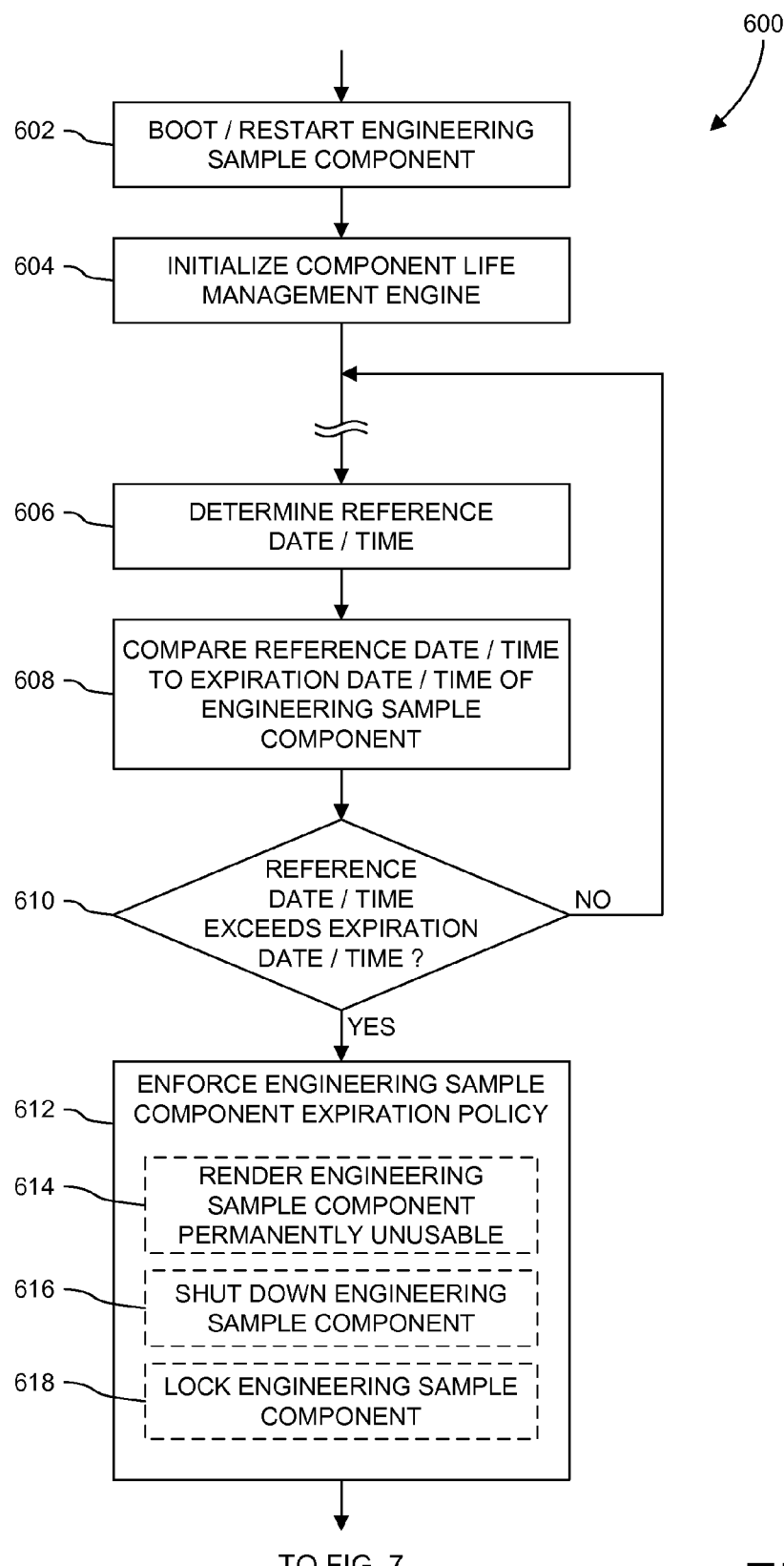
FIGS. 6 and 7 are simplified block diagrams of at least one embodiment of a method for managing and enforcing an expiration policy on the electronic engineering sample component of FIG. 1 using the computing device and the remote unlock server of FIG. 5.
Figure 7:
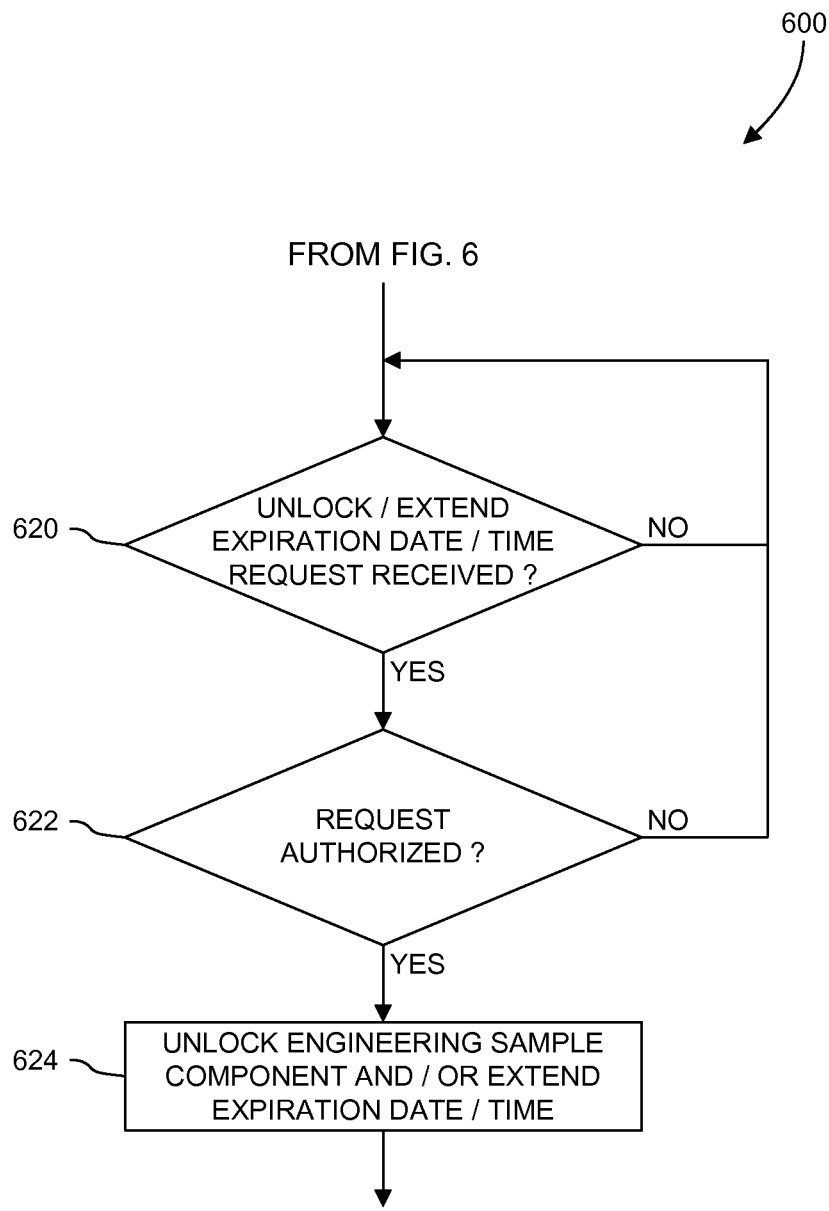

Referring now to FIGS. 6 and 7, at least one embodiment of a method 600 for managing and enforcing an expiration policy on the electronic engineering sample component 120 using the computing device 102 and the remote unlock server 540 begins with block 602. In block 602, the electronic engineering sample component 120 is booted and/or restarted. As discussed above, the electronic engineering sample component 120 may also be hot-swapped and/or hot-plugged into the computing device 102 in some embodiments. Upon booting, restarting, or otherwise initializing the electronic engineering sample component 120, the method 600 advances to block 604.

In block 604, the component life management engine 216 is initialized. The component life management engine 216 may comprise logic (e.g., firmware, software, instructions, hardware, software, or any combination thereof) to enforce one or more policies that either permit or restrict usage of the electronic engineering sample component 120 in response to one or more reference events occurring or conditions being met. In some embodiments, the component life management engine 216 may enforce a policy setting forth a maximum time that the electronic engineering sample component 120 may be used. To do so, the component life management engine 216 may retrieve a manufacture date and time 516 of the electronic engineering sample component 120 from the secure memory 514. In such embodiments, the component life management engine 216 may configure a timer module 524 to comprise a reference date and time as a function of the manufacture date and time 516 of the electronic engineering sample component 120. The component life management engine 216 may do so during a first boot or initialization of the electronic engineering sample component 120. After initializing the component life management engine 216, the method 600 advances to block 606.

In block 606, the component life management engine 216 determines a reference date/time. To do so, the component life management engine 216 may retrieve the reference date/time from the timer module 524. The method 600 then advances to block 608.

In block 608, the reference date/time is compared to an expiration date/time 518, 520 corresponding to the electronic engineering sample component 120. As discussed above, the semiconductor device manufacturer and one or more of an OEM, an ODM, an ISV may securely store an expiration date/time 518, 520 corresponding to the maximum date/time for which the electronic engineering sample component 120 may be used. The expiration date/time 518, 520 may be securely stored in the secure memory 514. The component life management engine 216 may retrieve the expiration date/time 518, 520 corresponding to the electronic engineering sample component 120. Thereafter, the component life management engine 216 may compare the retrieved expiration date/time 518, 520 to the reference date/time. The method 600 then advances to block 610.

In block 610, the component life management engine 216 determines whether the reference date/time exceeds the expiration date/time 518, 520 for the electronic engineering sample component 120. If, at block 610, the component life management engine 216 determines the reference date/time does not exceed the expiration date/time 518, 520, the method 600 loops back to block 606 to make another determination. If, however, the component life management engine 216 determines the reference date/time exceeds the expiration date/time 518, 520, the method 600 advances to block 612.

In block 612, the component life management engine 216 enforces the policy setting forth the maximum time the electronic engineering sample component 120 may be used. To do so, the component life management engine 216 may perform one or more actions to take in response to the electronic engineering sample component 120 being used for the maximum amount of time. For example, in block 614, the component life management engine 216 may render the electronic engineering sample component 120 permanently unusable. Additionally or alternatively, the component life management engine 216 may shut down the electronic engineering sample component 120 in block 616. In block 618, the component life management engine 216 may instead lock the electronic engineering sample component 120. The component life management engine 216 may enforce one or more other policies 214 on the electronic engineering sample component 120 in some embodiments. The method 600 then advances to block 620.

In block 620, the component life management engine 216 may determine whether a request to unlock and/or extend the expiration date/time 518, 520 of the electronic engineering sample component 120 has been received. In some embodiments, the component life management engine 216 may receive the request from a BIOS authentication screen using the security engine 502 as a secure proxy. The request may comprise an unlock code in some embodiments. If, at block 620, the component life management engine 216 determines that a request to unlock and/or extend the expiration date/time 518, 520 of the electronic engineering sample component 120 has been received, the method 600 advances to block 622. If, however, it is determined a request has not been received, the method 600 returns to block 620 to monitor for the receipt of a request to unlock or extend the expiration date/time 518, 520 of the electronic engineering sample component 120.

In block 622, the component life management engine 216 may determine whether the request to unlock or extend the expiration date/time 518, 520 of the electronic engineering sample component 120 is authorized. To do so, the component life management engine 216 may verify the unlock code embodied within the request. If, at block 622, the component life management engine 216 determines that the unlock code is not authorized, the method 600 returns to block 620 to monitor for the receipt of another request to unlock or extend the expiration date/time 518, 520 of the electronic engineering sample component 120. If, however, the component life management engine 216 determines at block 622 that the unlock code is authorized, the method 600 advances to block 624 in which the component life management engine 216 unlocks and/or re-enables the electronic engineering sample component 120 using the unlock code.

EXAMPLES

Illustrative examples of the devices, systems, and methods disclosed herein are provided below. An embodiment of the devices, systems, and methods may include any one or more, and any combination of, the examples described below.

Example 1 includes an electronic engineering sample component including a first one-time programmable fuse to store a manufacture date corresponding to the electronic engineering sample component; a second one-time programmable fuse to store an expiration date corresponding to the electronic engineering sample component; a timer module to increment a timer, the timer having an initial date value corresponding to the manufacture date of the electronic engineering sample component; and a component life management engine to enforce a policy as a function of a current date value of the timer and the expiration date corresponding to the electronic engineering sample component, wherein the component life management engine further to disable the electronic engineering sample component in response to the current date value of the timer exceeding the expiration date.

Example 2 includes the subject matter of Example 1, and wherein the component life management engine further to compare the current date value of the timer with the expiration date corresponding to the electronic engineering sample component.

Example 3 includes the subject matter of any of Examples 1 and 2, and wherein to disable the electronic engineering sample component in response to the current date value of the timer exceeding the expiration date includes one or more of to lock, shut down, and permanently disable the electronic engineering sample component.

Example 4 includes the subject matter of any of Examples 1-3, and wherein the component life management engine further to (i) retrieve the manufacture date corresponding to the electronic engineering sample component from the first one-time programmable fuse upon first initialization of the of the electronic engineering sample component and (ii) configure the initial date value of the timer to comprise the retrieved manufacture date corresponding to the electronic engineering sample component.

Example 5 includes the subject matter of any of Examples 1-4, and wherein the timer module includes a battery to preserve the current date value of the timer, and wherein the component life management engine includes component management services logic to detect removal of the battery, the component life management engine to disable the electronic engineering sample component in response to detecting the removal of the battery from the timer module.

Example 6 includes the subject matter of any of Examples 1-5, and wherein the electronic engineering sample component includes a processor or another component of a computing device.

Example 7 includes the subject matter of any of Examples 1-6, and wherein the electronic engineering sample component includes a processor of a computing device; and wherein to disable the electronic engineering sample component in response to the current date value of the timer exceeding the expiration date includes to lock the electronic engineering sample component.

Example 8 includes the subject matter of any of Examples 1-7, and wherein the component life management engine further to (i) determine whether a security engine of the computing device is enabled in response to the electronic engineering sample component being locked; (ii) receive an unlock code from a basic input/basic output system of the computing device using the security engine as a secure proxy in response to the electronic engineering sample component being locked; (iii) determine whether the unlock code is authorized in response to receiving the unlock code from the basic input/basic output system; and (iv) unlock the electronic engineering sample component in response to determining that the unlock code is authorized.

Example 9 includes the subject matter of any of Examples 1-8, and further including a third one-time programmable fuse to store another expiration date corresponding to the electronic engineering sample component, the another expiration date corresponding to a different expiration date of the electronic engineering sample component.

Example 10 includes the subject matter of any of Examples 1-9, and wherein the manufacture date, the expiration date, the initial date value, and the current date value comprise a manufacture date and time, an expiration date and time, an initial date and time value, and a current date and time value.

Example 11 includes the subject matter of any of Examples 1-10, and wherein the component life management engine further to (i) enforce a usage policy as a function of a current use of the electronic engineering sample component and an intended use of the electronic engineering sample component; and (ii) disable the electronic engineering sample component in response to the current use exceeding the intended use.

Example 12 includes a method for enforcing a policy with an electronic engineering sample component including storing a manufacture date corresponding to the electronic engineering sample component in a first one-time programmable fuse; storing an expiration date corresponding to the electronic engineering sample component in a second one-time programmable fuse; incrementing a timer having an initial date value corresponding to the manufacture date of the electronic engineering sample component; enforcing an expiration policy as a function of a current date value of the timer and the expiration date corresponding to the electronic engineering sample component; and disabling the electronic engineering sample component in response to the current date value of the timer exceeding the expiration date.

Example 13 includes the subject matter of Example 12, and further including comparing the current date value of the timer with the expiration date corresponding to the electronic engineering sample component.

Example 14 includes the subject matter of any of Examples 12 and 13, and wherein disabling the electronic engineering sample component in response to the current date value of the timer exceeding the expiration date includes one or more of locking shutting down, and permanently disabling the electronic engineering sample component.

Example 15 includes the subject matter of any of Examples 12-14, and further including retrieving the manufacture date corresponding to the electronic engineering sample component from the first one-time programmable fuse upon first initialization of the of the electronic engineering sample component; and configuring the initial date value of the timer to comprise the retrieved manufacture date corresponding to the electronic engineering sample component.

Example 16 includes the subject matter of any of Examples 12-15, and further including preserving the current date value of the timer with a battery of the timer; detecting removal of the battery of the timer; and disabling the electronic engineering sample component in response to detecting the removal of the battery from the timer.

Example 17 includes the subject matter of any of Examples 12-16, and wherein the electronic engineering sample component includes a processor or another component of a computing device.

Example 18 includes the subject matter of any of Examples 12-17, and wherein the electronic engineering sample component includes a processor of a computing device; and wherein disabling the electronic engineering sample component in response to the current date value of the timer exceeding the expiration date includes locking the electronic engineering sample component.

Example 19 includes the subject matter of any of Examples 12-18, and further including determining whether a security engine of the computing device is enabled in response to the electronic engineering sample component being locked; receiving an unlock code from a basic input/basic output system of the computing device using the security engine as a secure proxy in response to the electronic engineering sample component being locked; determining whether the unlock code is authorized in response to receiving the unlock code from the basic input/basic output system; and unlocking the electronic engineering sample component in response to determining that the unlock code is authorized.

Example 20 includes the subject matter of any of Examples 12-19, and further including storing another expiration date corresponding to the electronic engineering sample component, the another expiration date corresponding to a different expiration date of the electronic engineering sample component.

Example 21 includes the subject matter of any of Examples 12-20, and further including enforcing a usage policy as a function of a current use of the electronic engineering sample component and an intended use of the electronic engineering sample component; and disabling the electronic engineering sample component in response to the current use exceeding the intended use.

Example 22 includes the subject matter of any of Examples 12-21, and wherein the manufacture date, the expiration date, the initial date value, and the current date value comprise a manufacture date and time, an expiration date and time, an initial date and time value, and a current date and time value.

Example 23 includes a computing device for enforcing a policy with an electronic engineering sample component, the computing device including a processor and a memory having stored therein a plurality of instructions that, when executed by the processor, cause the computing device to perform the method of any of Examples 12-22.

Example 24 includes one or more machine readable storage media including a plurality of instructions stored thereon that, in response to being executed, result in a computing device performing the method of any of Examples 12-22.

Example 25 includes a computing device for enforcing a policy on an electronic engineering sample component including a first processor; an electronic engineering sample component; a security engine including a second processor to operate independently of the first processor; a secure memory accessible to the security engine and inaccessible to the first processor or other components of the computing device, the secure memory to store (i) a manufacture date corresponding to the electronic engineering sample component and (ii) an expiration date corresponding to the electronic engineering sample component; a timer module to increment a timer, the timer having an initial date value corresponding to the manufacture date of the electronic engineering sample component; and wherein the security engine further to enforce an expiration policy as a function of a current date value of the timer and the expiration date corresponding to the electronic engineering sample component.

Example 26 includes the subject matter of Example 25, and wherein the security engine further to compare the current date value of the timer with the expiration date corresponding to the electronic engineering sample component.

Example 27 includes the subject matter of any of Examples 25 and 26, and wherein to enforce an expiration policy includes one or more of to lock, to shut down, and to permanently disable the electronic engineering sample component in response to the current date value of the timer exceeding the expiration date.

Example 28 includes the subject matter of any of Examples 25-27, and wherein the security engine further to (i) retrieve the manufacture date corresponding to the electronic engineering sample component from secure memory upon first initialization of the electronic engineering sample component and (ii) configure the initial date value of the timer to comprise the retrieved manufacture date corresponding to the electronic engineering sample component.

Example 29 includes the subject matter of any of Examples 25-28, and wherein the electronic engineering sample component includes a processor or another component of the computing device.

Example 30 includes the subject matter of any of Examples 25-29, and wherein the electronic engineering sample component includes a processor of the computing device; and wherein to enforce an expiration policy includes to disable the electronic engineering sample component in response to the current date value of the timer exceeding the expiration date includes to lock the electronic engineering sample component.

Example 31 includes the subject matter of any of Examples 25-30, and wherein the security engine further to (i) receive an unlock code from a remote unlock server in response to the electronic engineering sample component being locked; (ii) determine whether the unlock code is authorized in response to receiving the unlock code from the remote unlock server; and (iii) unlock the electronic engineering sample component in response to determining that the unlock code is authorized.

Example 32 includes the subject matter of any of Examples 25-31, and wherein the secure memory further to store another expiration date corresponding to the electronic engineering sample component, the another expiration date corresponding to a different expiration date of the electronic engineering sample component.

Example 33 includes the subject matter of any of Examples 25-32, and wherein the manufacture date, the expiration date, the initial date value, and the current date value comprise a manufacture date and time, an expiration date and time, an initial date and time value, and a current date and time value.

Example 34 includes the subject matter of any of Examples 25-33, and wherein the secure memory further to store tracking data corresponding to the electronic engineering sample component.

Example 35 includes the subject matter of any of Examples 25-34, and further including radio-frequency identification circuitry to securely receive the tracking data; and wherein the security engine further to store the received tracking data in the secure memory of the computing device.

Example 36 includes the subject matter of any of Examples 25-35, and wherein the security engine further to (i) enforce a usage policy as a function of a current use of the electronic engineering sample component and an intended use of the electronic engineering sample component; and (ii) disable the electronic engineering sample component in response to the current use exceeding the intended use.

Example 37 includes a method for enforcing a policy on an electronic engineering sample component including storing a manufacture date corresponding to the electronic engineering sample component in a secure memory of a computing device; storing an expiration date corresponding to the electronic engineering sample component in the secure memory of the computing device; incrementing a timer having an initial date value corresponding to the manufacture date of the electronic engineering sample component; enforcing, by a security engine of the computing device, an expiration policy as a function of a current date value of the timer and the expiration date corresponding to the electronic engineering sample component; and disabling, by the security engine, the electronic engineering sample component in response to the current date value of the timer exceeding the expiration date.

Example 38 includes the subject matter of Example 37, and further including comparing, by the security engine, the current date value of the timer with the expiration date corresponding to the electronic engineering sample component.

Example 39 includes the subject matter of any of Examples 37 and 38, and wherein disabling the electronic engineering sample component in response to the current date value of the timer exceeding the expiration date includes one or more of locking shutting down, and permanently disabling the electronic engineering sample component.

Example 40 includes the subject matter of any of Examples 37-39, and further including retrieving, by the security engine, the manufacture date corresponding to the electronic engineering sample component from secure memory upon first initialization of the of the electronic engineering sample component; and configuring, by the security engine, the initial date value of the timer to comprise the retrieved manufacture date corresponding to the electronic engineering sample component.

Example 41 includes the subject matter of any of Examples 37-40, and wherein the electronic engineering sample component includes a processor or another component of the computing device.

Example 42 includes the subject matter of any of Examples 37-41, and wherein the electronic engineering sample component includes a processor of the computing device; and wherein disabling the electronic engineering sample component in response to the current date value of the timer exceeding the expiration date includes locking the electronic engineering sample component.

Example 43 includes the subject matter of any of Examples 37-42, and further including receiving, by the security engine, an unlock code from a remote unlock server in response to the electronic engineering sample component being locked; determining, by the security engine, whether the unlock code is authorized in response to receiving the unlock code from the remote unlock server; and unlocking, by the security engine, the electronic engineering sample component in response to determining that the unlock code is authorized.

Example 44 includes the subject matter of any of Examples 37-43, and further including storing another expiration date corresponding to the electronic engineering sample component in the secure memory of the computing device, the another expiration date corresponding to a different expiration date of the electronic engineering sample component.

Example 45 includes the subject matter of any of Examples 37-44, and further including enforcing, by the security engine, a usage policy as a function of a current use of the electronic engineering sample component and an intended use of the electronic engineering sample component; and disabling, by the security engine, the electronic engineering sample component in response to the current use exceeding the intended use.

Example 46 includes the subject matter of any of Examples 37-45, and wherein the manufacture date, the expiration date, the initial date value, and the current date value comprise a manufacture date and time, an expiration date and time, an initial date and time value, and a current date and time value.

Example 47 includes the subject matter of any of Examples 37-46, and further including storing tracking data corresponding to the electronic engineering sample component in the secure memory of the computing device.

Example 48 includes the subject matter of any of Examples 37-47, and further including securely receiving the tracking data with radio-frequency identification circuitry; and storing the received tracking data in the secure memory of the computing device.

Example 49 includes a computing device for enforcing a policy on an electronic engineering sample component, the computing device including a processor and a memory having stored therein a plurality of instructions that, when executed by the processor, cause the computing device to perform the method of any of Examples 37-48.

Example 50 includes one or more machine readable storage media including a plurality of instructions stored thereon that, in response to being executed, result in a computing device performing the method of any of Examples 37-48.

The invention claimed is:

1. An electronic engineering sample component comprising:
    a first one-time programmable fuse to store a manufacture date corresponding to the electronic engineering sample component;
    a second one-time programmable fuse to store an expiration date corresponding to the electronic engineering sample component;
    a timer module to increment a timer, the timer having an initial date value corresponding to the manufacture date of the electronic engineering sample component; and
    a component life management engine to enforce a policy as a function of a current date value of the timer and the expiration date corresponding to the electronic engineering sample component, wherein the component life management engine further to disable the electronic engineering sample component in response to the current date value of the timer exceeding the expiration date.

2. The electronic engineering sample component of claim 1, wherein the component life management engine further to compare the current date value of the timer with the expiration date corresponding to the electronic engineering sample component.

3. The electronic engineering sample component of claim 1, wherein to disable the electronic engineering sample component in response to the current date value of the timer exceeding the expiration date comprises one or more of to lock, shut down, and permanently disable the electronic engineering sample component.

4. The electronic engineering sample component of claim 1, wherein the component life management engine further to:
    (i) retrieve the manufacture date corresponding to the electronic engineering sample component from the first one-time programmable fuse upon first initialization of the of the electronic engineering sample component; and
    (ii) configure the initial date value of the timer to comprise the retrieved manufacture date corresponding to the electronic engineering sample component.

5. The electronic engineering sample component of claim 1, wherein the timer module comprises a battery to preserve the current date value of the timer, and
    wherein the component life management engine comprises component management services logic to detect removal of the battery, the component life management engine to disable the electronic engineering sample component in response to detecting the removal of the battery from the timer module.

6. The electronic engineering sample component of claim 1, wherein the electronic engineering sample component comprises a processor or another component of a computing device;
    wherein to disable the electronic engineering sample component in response to the current date value of the timer exceeding the expiration date comprises to lock the electronic engineering sample component; and
    wherein the component life management engine further to:
    (i) determine whether a security engine of the computing device is enabled in response to the electronic engineering sample component being locked,
    (ii) receive an unlock code from a basic input/basic output system of the computing device using the security engine as a secure proxy in response to the electronic engineering sample component being locked,
    (iii) determine whether the unlock code is authorized in response to receiving the unlock code from the basic input/basic output system, and
    (iv) unlock the electronic engineering sample component in response to determining that the unlock code is authorized.

7. The electronic engineering sample component of claim 1, further comprising a third one-time programmable fuse to store another expiration date corresponding to the electronic engineering sample component, the another expiration date corresponding to a different expiration date of the electronic engineering sample component.

8. The electronic engineering sample component of claim 1, wherein the component life management engine further to:
    (i) enforce a usage policy as a function of a current use of the electronic engineering sample component and an intended use of the electronic engineering sample component; and
    (ii) disable the electronic engineering sample component in response to the current use exceeding the intended use.

9. The electronic engineering sample component of claim 1, wherein the manufacture date, the expiration date, the initial date value, and the current date value comprise a manufacture date and time, an expiration date and time, an initial date and time value, and a current date and time value.

10. One or more non-transitory machine-readable storage media comprising a plurality of instructions stored thereon that, in response to being executed, result in a computing device:
    storing a manufacture date corresponding to the electronic engineering sample component in a first one-time programmable fuse;
    storing an expiration date corresponding to the electronic engineering sample component in a second one-time programmable fuse;
    incrementing a timer having an initial date value corresponding to the manufacture date of the electronic engineering sample component;

enforcing an expiration policy as a function of a current date value of the timer and the expiration date corresponding to the electronic engineering sample component; and disabling the electronic engineering sample component in response to the current date value of the timer exceeding the expiration date.

11. The one or more non-transitory machine-readable storage media of claim 10, further comprising instructions that, in response to being executed, result in the computing device comparing the current date value of the timer with the expiration date corresponding to the electronic engineering sample component; and wherein disabling the electronic engineering sample component in response to the current date value of the timer exceeding the expiration date comprises one or more of locking shutting down, and permanently disabling the electronic engineering sample component.

12. The one or more non-transitory machine-readable storage media of claim 10, further comprising instructions that, in response to being executed, result in the computing device:

retrieving the manufacture date corresponding to the electronic engineering sample component from the first one-time programmable fuse upon first initialization of the of the electronic engineering sample component; and configuring the initial date value of the timer to comprise the retrieved manufacture date corresponding to the electronic engineering sample component.

13. The one or more non-transitory machine-readable storage media of claim 10, further comprising instructions that, in response to being executed, result in the computing device:

preserving the current date value of the timer with a battery of the timer;

detecting removal of the battery of the timer; and disabling the electronic engineering sample component in response to detecting the removal of the battery from the timer.

14. The one or more non-transitory machine-readable storage media of claim 10, wherein the electronic engineering sample component comprises a processor or another component of a computing device;

wherein disabling the electronic engineering sample component in response to the current date value of the timer exceeding the expiration date comprises locking the electronic engineering sample component; and wherein the one or more machine readable storage media further comprising instructions that, in response to being executed, result in the computing device:

determining whether a security engine of the computing device is enabled in response to the electronic engineering sample component being locked, receiving an unlock code from a basic input/basic output system of the computing device using the security engine as a secure proxy in response to the electronic engineering sample component being locked, determining whether the unlock code is authorized in response to receiving the unlock code from the basic input/basic output system, and unlocking the electronic engineering sample component in response to determining that the unlock code is authorized.

15. The one or more non-transitory machine-readable storage media of claim 10, further comprising instructions that, in response to being executed, result in the computing device:

enforcing a usage policy as a function of a current use of the electronic engineering sample component and an intended use of the electronic engineering sample component; and disabling the electronic engineering sample component in response to the current use exceeding the intended use.

16. A computing device for enforcing a policy on an electronic engineering sample component comprising:

a first processor;

an electronic engineering sample component;

a security engine comprising a second processor to operate independently of the first processor;

a secure memory accessible to the security engine and inaccessible to the first processor or other components of the computing device, the secure memory to store (i) a manufacture date corresponding to the electronic engineering sample component and (ii) an expiration date corresponding to the electronic engineering sample component;

a timer module to increment a timer, the timer having an initial date value corresponding to the manufacture date of the electronic engineering sample component; and wherein the security engine further to enforce an expiration policy as a function of a current date value of the timer and the expiration date corresponding to the electronic engineering sample component.

17. The computing device of claim 16, wherein the security engine further to compare the current date value of the timer with the expiration date corresponding to the electronic engineering sample component.

18. The computing device of claim 16, wherein to enforce an expiration policy comprises one or more of to lock, to shut down, and to permanently disable the electronic engineering sample component in response to the current date value of the timer exceeding the expiration date.

19. The computing device of claim 16, wherein the security engine further to:

(i) retrieve the manufacture date corresponding to the electronic engineering sample component from secure memory upon first initialization of the electronic engineering sample component; and (ii) configure the initial date value of the timer to comprise the retrieved manufacture date corresponding to the electronic engineering sample component.

20. The computing device of claim 16, wherein the electronic engineering sample component comprises a processor or another component of the computing device;

wherein to enforce an expiration policy comprises to lock the electronic engineering sample component in response to the current date value of the timer exceeding the expiration date; and wherein the security engine further to:

(i) receive an unlock code from a remote unlock server in response to the electronic engineering sample component being locked, (ii) determine whether the unlock code is authorized in response to receiving the unlock code from the remote unlock server, and (iii) unlock the electronic engineering sample component in response to determining that the unlock code is authorized.

21. The computing device of claim 16, the secure memory further to store another expiration date corresponding to the electronic engineering sample component, the another expiration date corresponding to a different expiration date of the electronic engineering sample component.

22. The computing device of claim 16, wherein the security engine further to:
(i) enforce a usage policy as a function of a current use of the electronic engineering sample component and an intended use of the electronic engineering sample component; and
(ii) disable the electronic engineering sample component in response to the current use exceeding the intended use.

23. The computing device of claim 16, wherein the manufacture date, the expiration date, the initial date value, and the current date value comprise a manufacture date and time, an expiration date and time, an initial date and time value, and a current date and time value.

24. The computing device of claim 16, further comprising radio-frequency identification circuitry to securely receive tracking data corresponding to the electronic engineering sample component; and
wherein the security engine further to store the received tracking data corresponding to the electronic engineering sample component in the secure memory of the computing device.

25. One or more non-transitory machine-readable storage media comprising a plurality of instructions stored thereon that, in response to being executed, result in a computing device:
storing a manufacture date corresponding to the electronic engineering sample component in a secure memory of a computing device;
storing an expiration date corresponding to the electronic engineering sample component in the secure memory of the computing device;
incrementing a timer having an initial date value corresponding to the manufacture date of the electronic engineering sample component;
enforcing, by a security engine of the computing device, an expiration policy as a function of a current date value of the timer and the expiration date corresponding to the electronic engineering sample component; and
disabling, by the security engine, the electronic engineering sample component in response to the current date value of the timer exceeding the expiration date.

26. The one or more non-transitory machine-readable storage media of claim 25, further comprising instructions that, in response to being executed, result in the computing device comparing, by the security engine, the current date value of the timer with the expiration date corresponding to the electronic engineering sample component; and
wherein disabling the electronic engineering sample component in response to the current date value of the timer exceeding the expiration date comprises one or more of locking shutting down, and permanently disabling the electronic engineering sample component.

27. The one or more non-transitory machine-readable storage media of claim 25, further comprising instructions that, in response to being executed, result in the computing device:
retrieving, by the security engine, the manufacture date corresponding to the electronic engineering sample component from secure memory upon first initialization of the of the electronic engineering sample component; and
configuring, by the security engine, the initial date value of the timer to comprise the retrieved manufacture date corresponding to the electronic engineering sample component.

28. The one or more non-transitory machine-readable storage media of claim 25, wherein the electronic engineering sample component comprises a processor or another component of the computing device;
wherein disabling the electronic engineering sample component in response to the current date value of the timer exceeding the expiration date comprises locking the electronic engineering sample component; and
wherein the one or more machine readable storage media further comprising instructions that, in response to being executed, result in the computing device:
receiving, by the security engine, an unlock code from a remote unlock server in response to the electronic engineering sample component being locked,
determining, by the security engine, whether the unlock code is authorized in response to receiving the unlock code from the remote unlock server, and
unlocking, by the security engine, the electronic engineering sample component in response to determining that the unlock code is authorized.

29. The one or more non-transitory machine-readable storage media of claim 25, further comprising instructions that, in response to being executed, result in the computing device:
enforcing, by the security engine, a usage policy as a function of a current use of the electronic engineering sample component and an intended use of the electronic engineering sample component; and
disabling, by the security engine, the electronic engineering sample component in response to the current use exceeding the intended use.

30. The one or more non-transitory machine-readable storage media of claim 25, further comprising instructions that, in response to being executed, result in the computing device:
securely receiving, with radio-frequency identification circuitry, tracking data corresponding to the electronic engineering sample component; and
storing the received tracking data corresponding to the electronic engineering sample component in the secure memory of the computing device.

* * * * *